(12) United States Patent
Kelly et al.

(10) Patent No.: US 9,377,308 B2
(45) Date of Patent: Jun. 28, 2016

(54) INDOOR MAP DATA AS A RECALIBRATION SOURCE FOR LOW-COST MEMS INERTIAL NAVIGATION

(71) Applicant: mCube, Incorporated, San Jose, CA (US)

(72) Inventors: Joe Kelly, Center Point, IA (US); Jobe Price, North Liberty, IA (US); Rahul Bakshi, San Jose, CA (US); Mark D. Schneider, Cedar Rapids, IA (US)

(73) Assignee: mCube Inc., San Jose, CA (US)

( * ) Notice: Subject to any disclaimer, the term of this patent is extended or adjusted under 35 U.S.C. 154(b) by 236 days.

(21) Appl. No.: 13/758,707

(22) Filed: Feb. 4, 2013

(65) Prior Publication Data

US 2014/0149069 A1    May 29, 2014

Related U.S. Application Data

(60) Provisional application No. 61/594,338, filed on Feb. 2, 2012.

(51) Int. Cl.
*G01C 21/16* (2006.01)
*G01C 21/20* (2006.01)
*G01C 25/00* (2006.01)

(52) U.S. Cl.
CPC ............. *G01C 21/16* (2013.01); *G01C 21/206* (2013.01); *G01C 25/005* (2013.01)

(58) Field of Classification Search
CPC ........ G01C 21/10; G01C 21/12; G01C 21/14; G01C 21/16; G01C 21/165; G01C 21/18; G01C 21/20; G01C 21/206; G01C 21/26; G01C 21/30; G01C 21/32; G01C 25/005
See application file for complete search history.

(56) References Cited

PUBLICATIONS

Klingbeil et al., A Modular and Mobile System for Indoor Localization, Sep. 15-17, 2010, 2010 International Conference on Indoor Positioning and Indoor Navigation (IPIN), Zurich, Switzerland, 10 pp.*

* cited by examiner

*Primary Examiner* — Toan Le
(74) *Attorney, Agent, or Firm* — Kilpatrick Townsend and Stockton LLP

(57) ABSTRACT

A computer-implemented method for determining an estimated user location performed on a computer system programmed to perform the method includes determining in physical sensors, movements in response to movement of the computer system, determining in a processor a physical context, in response to the movements, determining in the processor whether the physical context is substantially similar to a map-based context associated with a location on the map, when a map-based context is substantially similar to the physical context, the method includes determining in the processor the location on the map associated with the map-based context, determining in the processor a graphical user interface in response to the location on the map, and displaying the graphical user interface on a display of the computer system.

22 Claims, 3 Drawing Sheets

INDOOR MAP DATA AS A RECALIBRATION SOURCE FOR LOW-COST MEMS INERTIAL NAVIGATION

CROSS-REFERENCE TO RELATED APPLICATIONS

The present invention claims priority to and is a non-provisional of U.S. Ser. No. 61/594,338 filed Feb. 2, 2012 that is incorporated by reference herein, for all purposes. The present invention also incorporates by reference, for all purposes, U.S. Ser. No. 13/755,242, filed Jan. 31, 2013, titled: EVENT AND CONTEXT DETECTION WITH MATCHED FILTER PROCESSING.

BACKGROUND

The present invention relates to navigation systems. More particularly, the present invention relates to indoor navigation of users utilizing hand-held smart devices.

Indoor navigation or location determination has typically been performed without the guidance of the Global Positioning Systems (GPS). Reasons for this include that GPS accuracy is typically insufficient for indoor purposes, that GPS signals are often obscured indoors, and the like. Because of this, indoor navigation can be more effectively performed using dead reckoning techniques.

The inventors of the present application have determined that dead reckoning, alone, for indoor navigation may have many problems. One problem is that different users may carry their devices in different ways, e.g. purse or pocket, accordingly, dead reckoning positioning errors are expected. Another problem is that since errors in dead reckoning positioning are cumulative, as a result, substantial errors in indoor navigation positioning are likely over time.

In light of the above, improved techniques to perform indoor navigation/positioning is desired without the drawbacks described above.

BRIEF SUMMARY OF THE INVENTION

The inertial and magnetic MEMS-based sensors within a smart-device, or the like, enable dead reckoning navigation that is more accurate than simple extrapolation of the last known position and velocity state of a user or electronic device. In various embodiments, sensed motion can be used to "coast" a solution in either two or three dimensions, with 6 degrees-of-freedom (translation and rotation), but errors may accumulate over time and cause accuracy to degrade. Accordingly, by detecting distinctive segments or characteristics of user motion (context) and matching to contexts determined in a map, embodiments provide a means for the navigation solution (position, velocity, heading) to be reset to lower levels of error. When provided with regularity, these resets will bound the error growth in the navigation solution.

More specifically, embodiments of the present invention enhance indoor navigation functionality by incorporating map-based references with MEMs-based location determination. Various embodiments of the present invention rely upon MEMS-based sensors within indoor environments to aid in determining locations of a device within such environments. The MEMS-based sensors may track changes in acceleration, pressure, rotation, magnetic fields, or the like, of the device, in one or more axes.

In various embodiments, contexts or actions may be initially defined by one or a combination of two or more MEMS-based actions. Additionally, in various embodiments, contexts or actions may be pre-associated with specific position on an indoor map, e.g. map-based contexts. Subsequently, incoming MEMS-based data are compared to the previously defined contexts to determine one or more present contexts of the user. These identified present contexts are then compared to the map-based contexts. In various embodiments, if there is a match between one or more present contexts and map-based contexts, the position of the user/device used within an internal navigation system is reset to the identified location.

According to one aspect of the invention, a computer-implemented method for determining an estimated user location performed on a computer system programmed to perform the method is described. One technique includes determining in a plurality of physical sensors in the computer system, a plurality of physical perturbations in response to a change in physical orientation of the computer system by a user, and determining in a processor in the computer system, a physical context of the computer system, in response to the plurality of physical perturbations. A process includes determining in the processor in the computer system, whether the physical context is substantially similar to one of a plurality of map-based contexts associated with a map, wherein each map-based context is associated with a location on the map. In some methods, when a map-based context is substantially similar to the physical context includes: determining in the processor a location on the map associated with the map-based context, determining in the processor a graphical user interface in response to the location on the map, and displaying on a display of the computer system, the graphical user interface to the user.

In another aspect of the invention, a computer system for determining an estimated user location is described. A device includes a plurality of physical sensors configured to determine a plurality of physical perturbations in response to a change in physical orientation of the computer system by a user, a memory configured to store a representation of a map, and a plurality of map-based contexts associated with locations on the map, and a display for displaying images to the user. An apparatus includes a processor coupled to the physical sensors, to the memory, and to the display, wherein the processor is programmed to determine a physical context of the computer system, in response to the plurality of physical perturbations, wherein the processor is programmed to determine whether the physical context is substantially similar to a map-based context from the plurality of map-based contexts associated with a map, wherein the processor is programmed to determine a location on the map associated with the map-based context, wherein the processor is programmed to determine a graphical user interface in response to the location on the map, and wherein the processor is programmed to display the graphical user interface on the display.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
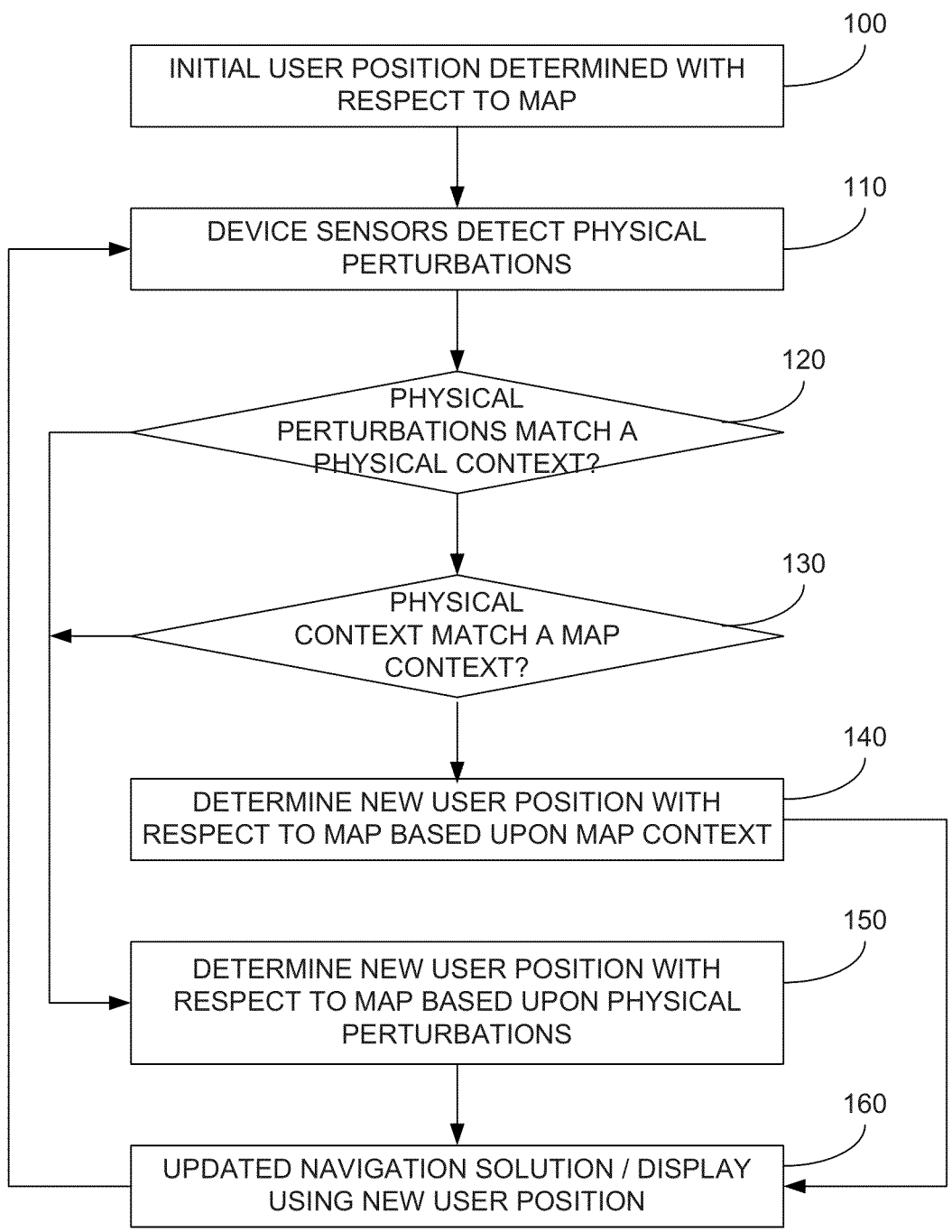
FIG. 1 illustrates an embodiment of the present invention.

FIG. 1 illustrates a block diagram of a flow chart according to various embodiments of the present invention. More specifically, FIG. 1 illustrates functions performed within a smart phone, or the like, typically by a combination of dedicated hardware, e.g. sensors (e.g. MEMS sensors), a processor, and/or software that programs hardware to perform specific functions.

In FIG. 1, an initial user position within the context of an interior map is determined, step 100. In various embodiments, this may be performed manually by the user indicating where they are with respect to a map, e.g. a specific entrance of a mall. In some embodiments, this may be done automatically via wireless means, such as WiFi, near field communications, or the like. In still other embodiments, the initial user position may simply be the estimated user position determined by the smart phone, during the previous user position determination time, e.g. 1 second ago, 10 seconds ago, etc. and may thus have a high degree of uncertainty, meaning only that larger portions of the surrounding mpa must be searched for matching contexts or physical maneuvers.

Next, in various embodiments, as the user moves within the indoor environment, the smart phone is subject to many types of physical perturbations, including changes in physical orientation (including positional or translational movement) and/or changes in physical conditions. Using sensors on the smart phone, these types of physical perturbations are sensed in step 110. In various embodiments, sensors may include MEM-based sensors, or the like. Typical types of sensors may include single or multiple-axis accelerometers, gyroscopes, magnetometers, or the like; pressure sensors; thermometers; or the like. These sensors may determine orientation of the smart device with respect to gravity, magnetic fields, changes in altitude, changes in temperature, and the like.

In various embodiments, the sensed physical perturbations may then be compared to predefined contexts, to determine a match, step 120. In some embodiments, contexts are combinations of physical perturbations that are characteristic of user movements typically within an indoor environment. One example of this is: when the only perturbations sensed by the sensors for a period of time is motion in approximately a single direction, the context may be the user walking down a hall. Another example of this is: when the user is moving in approximately a straight line, the user suddenly turns either left/right, and then moves forward, the context may be the user turning left/right in a hall. Yet another example of this is: when the user is moving in approximately a straight line, and the pressure decreases, the context may be the user going up stairs, an escalator, or the like. Still another example of this is: if the user is moving in approximately a straight line, the user turns either left/right, the user stopping, and then the user going forward, the context may be the user entering a door on the left/right. In light of the present disclosure, one of ordinary skill in the art would recognize many other combinations of sensed perturbations may be identified as a predefined context. In various embodiments, context matching may be performed using techniques described in the above-referenced co-pending patent application.

In various embodiments, if no physical contexts are determined, the process may proceed to step 150, below.

In various embodiments, indoor maps have these pre-defines contexts associated therewith. In particular, in various embodiments, hallways, stairs, doors, corners, elevators, and other features may be identified within a map, and have physical perturbation contexts associated therewith. For example, a long hallway may be associated with a "hallway" context, characterized by movement in approximately a single direction, with no rotation, magnetic field change, etc. As another example, a down escalator may be associated with an "escalator" context, characterized by a movement in approximately a single direction with an increase in atmospheric pressure. These contexts are typically similar to the contexts described above.

Next, in various embodiments, the physical context(s) determined in step 120, are compared to contexts associated with the map, i.e. map-based contexts, step 130. In various embodiments, matching of physical contexts may be made based upon a percentage confidence between one or more map-based contexts. These estimates, along with optional confidence values on each of the estimates, can be passed to an orientation solution through one or several state estimation techniques. Some examples of such techniques include Kalman Filtering, extrapolation, zero-order hold, particle filtering, or the like. In some embodiments, the method includes any system where new measurements of user two-dimensional or three-dimensional position and orientation are used to aid, reset, calibrate, or stabilize an estimate of user position, velocity and orientation to bound the growth of errors in the estimate.

As example of the above process, if in step 130 the physical context is identified as going up an elevator, this is compared to the map-based contexts pre-defined for the map. In this example, if a map-based context is defined, there is a match and the process proceeds to step 140. In various embodiments, if there is no match, the process may proceed to step 150.

In other embodiments, step 120 need not be performed, and the physical perturbation may be directly compared to the map-contexts defined for this map.

In FIG. 1, if there is match between a physical-context and a map-context, the current user position is updated to be located at the map location associated with the map context, step 140. For example, using a purely dead reckoning positioning system, a smart device may estimate the user position to be 20 feet from an escalator. When using embodiments of the present invention, when the user is riding the escalator, if the smart-device determines that the user is riding an escalator identified on a map, the smart device may re-estimate the user position to be on the escalator not 20 feet away. As another example, the smart device may re-estimate the user position to be within a hallway and not within a room.

In various embodiments, in step 150, wherein there in little confidence in a context match, the physical perturbations can be used to update an estimate the position of the user within a map, using conventional processes.

In various embodiments, using the updated user position (estimated or matched), the user position may be used to update the user position within a navigation solution, and/or a representation of the user location on a map may be updated on a display for the user to view, step 160. Subsequently, the process may repeat, as illustrated, using the updated user position as the input user position, as illustrated.

Figure 2:
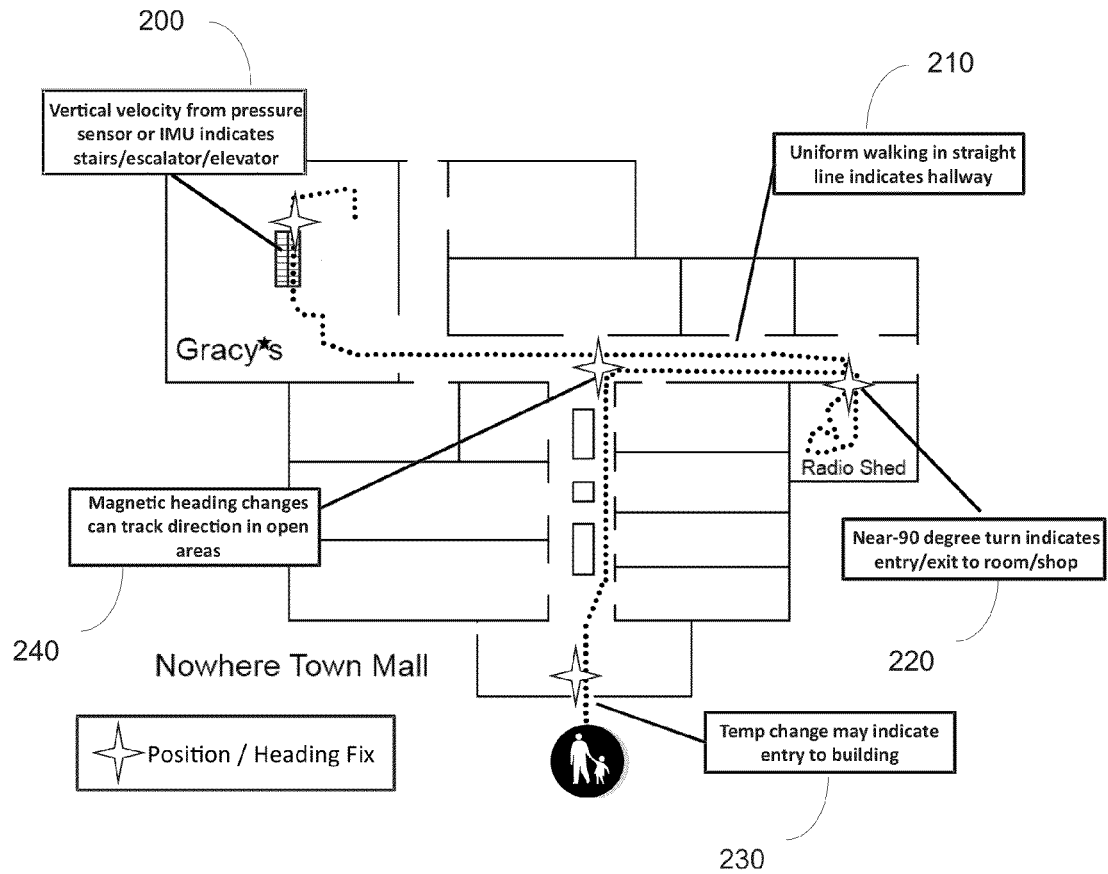
FIG. 2 illustrate an example according to embodiments of the present invention.

FIG. 2 illustrates examples of various embodiments of the present invention. More specifically, illustrates an example case of a user walking through a mall. In this example, various map-contexts may be pre-defined, such as an escalator/stair context 200, a hall context 210, a door context 220, an entrance context 230, a corner context 240. In other embodiments, many other types of map-based contexts may also be associated with the map. As illustrated in the FIG. 2, if physical-based contexts are determined to match any of 200-240 to a particular degree of confidence, the user position may be reestimated to the matching map-based context location to reduce errors that accumulate in the dead reckoning solution.

Figure 3:
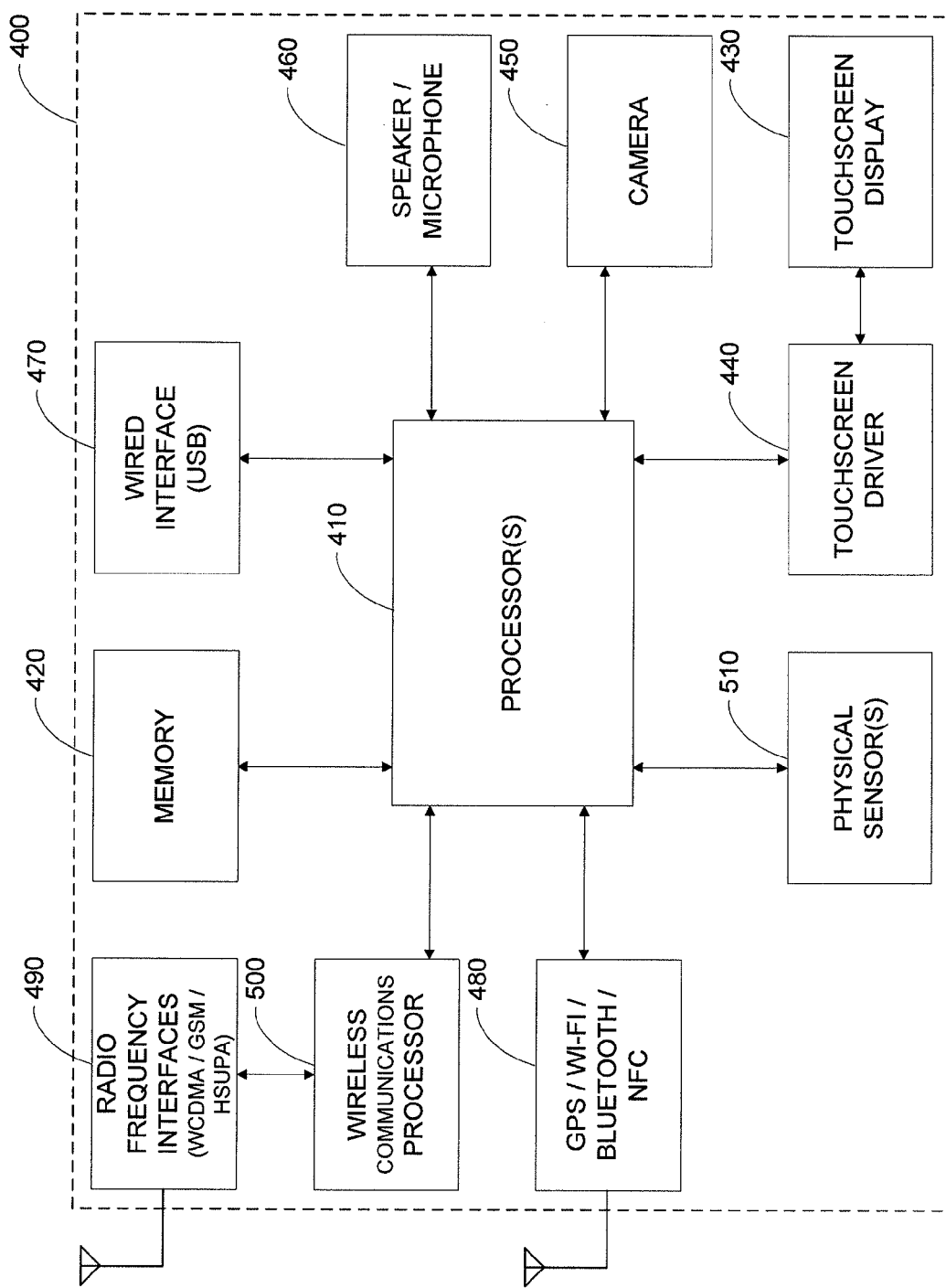
FIG. 3 illustrates a block diagram of a system according to some embodiments of the present invention.

FIG. 3 illustrates a functional block diagram of various embodiments of the present invention. In FIG. 3, a computing device 400 typically includes an applications processor 410, memory 420, a touch screen display 430 and driver 440, an image acquisition device 450, audio input/output devices 460, and the like. Additional communications from and to computing device are typically provided by via a wired interface 470, a GPS/Wi-Fi/Bluetooth interface 480, RF interfaces 490 and driver 500, and the like. Also included in various embodiments are physical sensors 510.

In various embodiments, computing device 400 may be a hand-held computing device (e.g. Apple iPad, Apple iTouch, Lenovo Skylight/IdeaPad, Asus EEE series, Microsoft 8 tablet, Samsung Galaxy Tab, Android Tablet), a portable telephone (e.g. Apple iPhone, Motorola Droid series, Google Nexus series, HTC Sensation, Samsung Galaxy S series, Nokia Lumina series), a portable computer (e.g. netbook, laptop, ultrabook), a media player (e.g. Microsoft Zune, Apple iPod), a reading device (e.g. Amazon Kindle Fire, Barnes and Noble Nook), or the like.

Typically, computing device 400 may include one or more processors 410. Such processors 410 may also be termed application processors, and may include a processor core, a video/graphics core, and other cores. Processors 410 may be a processor from Apple (A4/A5), Intel (Atom), NVidia (Tegra 3, 4, 5), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Further, in various embodiments, the video/graphics core may be an Imagination Technologies processor PowerVR-SGX, -MBX, -VGX graphics, an Nvidia graphics processor (e.g. GeForce), or the like. Other processing capability may include audio processors, interface controllers, and the like. It is contemplated that other existing and/or later-developed processors may be used in various embodiments of the present invention.

In various embodiments, memory 420 may include different types of memory (including memory controllers), such as flash memory (e.g. NOR, NAND), pseudo SRAM, DDR SDRAM, or the like. Memory 420 may be fixed within computing device 400 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 430 and driver 440 may be based upon a variety of later-developed or current touch screen technology including resistive displays, capacitive displays, optical sensor displays, electromagnetic resonance, or the like. Additionally, touch screen display 430 may include single touch or multiple-touch sensing capability. Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g.

sales, marketing). In some embodiments of the present invention, a display output port, such as an HDMI-based port or DVI-based port may also be included.

In some embodiments of the present invention, image capture device 450 may include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, or the like.

In various embodiments, audio input/output 460 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 410 to enable the user to operate computing device 400 by stating voice commands. Additionally, a speech engine may be provided in various embodiments to enable computing device 400 to provide audio status messages, audio response messages, or the like.

In various embodiments, wired interface 470 may be used to provide data transfers between computing device 400 and an external source, such as a computer, a remote server, a storage network, another computing device 400, or the like. Such data may include application data, operating system data, firmware, or the like. Embodiments may include any later-developed or conventional physical interface/protocol, such as: USB 4.0, 5.0, micro USB, mini USB, Firewire, Apple iPod connector, Ethernet, POTS, or the like. Additionally, software that enables communications over such networks is typically provided.

In various embodiments, a wireless interface 480 may also be provided to provide wireless data transfers between computing device 400 and external sources, such as computers, storage networks, headphones, microphones, cameras, or the like. As illustrated in FIG. 3, wireless protocols may include Wi-Fi (e.g. IEEE 802.11a/b/g/n, WiMax), Bluetooth, IR, near field communication (NFC), ZigBee and the like.

GPS receiving capability may also be included in various embodiments of the present invention, however is not required. As illustrated in FIG. 3, GPS functionality is included as part of wireless interface 480 merely for sake of convenience, although in implementation, such functionality is currently performed by circuitry that is distinct from the Wi-Fi circuitry and distinct from the Bluetooth circuitry.

Additional wireless communications may be provided via RF interfaces 490 and drivers 500 in various embodiments. In various embodiments, RF interfaces 490 may support any future-developed or conventional radio frequency communications protocol, such as CDMA-based protocols (e.g. WCDMA), GSM-based protocols, HSUPA-based protocols, or the like. In the embodiments illustrated, driver 500 is illustrated as being distinct from applications processor 410. However, in some embodiments, these functionality are provided upon a single IC package, for example the Marvel PXA330 processor, and the like. It is contemplated that some embodiments of computing device 400 need not include the RF functionality provided by RF interface 490 and driver 500.

FIG. 3 also illustrates computing device 400 to include physical sensors 510. In various embodiments of the present invention, physical sensors 510 are multi-axis Micro-Electro-Mechanical Systems (MEMS) based devices being developed by M-cube, the assignee of the present patent application. Physical sensors 510 developed by M-cube, the assignee of the present patent application, currently include very low power three-axis sensors (linear, gyro or magnetic); ultra-low jitter three-axis sensors (linear, gyro or magnetic); low cost six-axis motion sensor (combination of linear, gyro, and/or magnetic); ten-axis sensors (linear, gyro, magnetic, pressure); and various combinations thereof.

Various embodiments may include an accelerometer with a reduced substrate displacement bias, as described above. Accordingly, using such embodiments, computing device 400 is expected to have a lower sensitivity to temperature variations, lower sensitivity to production/assembly forces imparted upon to an accelerometer, faster calibration times, lower production costs, and the like.

As described in the patent applications referenced above, various embodiments of physical sensors 510 are manufactured using a foundry-compatible process. As explained in such applications, because the process for manufacturing such physical sensors can be performed on a standard CMOS fabrication facility, it is expected that there will be a broader adoption of such components into computing device 400. In other embodiments of the present invention, conventional physical sensors 510 from Bosch, STMicroelectronics, Analog Devices, Kionix or the like may be used.

In various embodiments, any number of future developed or current operating systems may be supported, such as iPhone OS (e.g. iOS), WindowsMobile (e.g. 7, 8), Google Android (e.g. 5.x, 4.x), Symbian, or the like. In various embodiments of the present invention, the operating system may be a multi-threaded multi-tasking operating system. Accordingly, inputs and/or outputs from and to touch screen display 430 and driver 440 and inputs/or outputs to physical sensors 510 may be processed in parallel processing threads. In other embodiments, such events or outputs may be processed serially, or the like. Inputs and outputs from other functional blocks may also be processed in parallel or serially, in other embodiments of the present invention, such as image acquisition device 450 and physical sensors 510.

FIG. 3 is representative of one computing device 400 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 3. For example, in various embodiments, computing device 400 may lack image acquisition unit 450, or RF interface 490 and/or driver 500, or GPS capability, or the like. Additional functions may also be added to various embodiments of computing device 400, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for determining an estimated user location performed on a computer system programmed to perform the method, comprising:
   determining in a plurality of physical sensors in the computer system, a plurality of physical perturbations in response to a change in physical orientation of the computer system by a user, wherein the plurality of physical sensors includes two or more sensors selected from the group consisting of an accelerometer, a magnetometer, a magnetometer, and a gyroscope;
   determining in a processor in the computer system, a physical context of the computer system, in response to the plurality of physical perturbations, the physical context describing a user movement associated with the plurality of physical perturbations;
   determining in the processor in the computer system, whether the physical context is substantially similar to one of a plurality of map-based contexts associated with a map, wherein each map-based context is associated with a location on the map; and
   when the physical context is substantially similar to one of the plurality of map-based contexts, the method comprises:
      determining in the processor a location on the map associated with the one of the plurality of map-based context;
      determining in the processor a graphical user interface in response to the location on the map; and
      displaying on a display of the computer system, the graphical user interface to the user.

2. The computer-implemented method of claim 1 wherein the physical context is selected from a group consisting of: moving down a hall, entering a room, turning left, turning right, descending floors, ascending floors.

3. The computer-implemented method of claim 1 wherein the plurality of map-based contexts comprises a hallway context, characterized by movement in approximately a single direction, with no rotation, magnetic field change.

4. The computer-implemented method of claim 3
   wherein the plurality of map-based contexts comprises an escalator context, characterized by a movement in approximately a single direction with an increase in atmospheric pressure.

5. The computer-implemented method of claim 1
   wherein the plurality of map-based contexts comprises one or more contexts selected from a group consisting of an escalator/stair context, a hall context, a door context, an entrance context, and a corner context.

6. The computer-implemented method of claim 1
   wherein the plurality of physical sensors comprises a temperature sensor; and
   wherein determining in the plurality of physical sensors in the computer system comprises determining in the temperature sensor, a temperature reading in response to the change in physical orientation of the computer system by the user.

7. The computer-implemented method of claim 1 wherein the map-based context is selected from a group consisting of: moving down a hall, entering a room, turning left, turning right, descending floors, ascending floors.

8. The computer-implemented method of claim 1 wherein when the map-based context is substantially similar to the physical context, the method further comprises providing in the processor the location on the map to a navigation application running in the processor.

9. A computer system for determining an estimated user location comprising:
   a plurality of physical sensors configured to determine a plurality of physical perturbations in response to a change in physical orientation of the computer system by a user, wherein the plurality of physical sensors includes an accelerometer;
   a memory configured to store a representation of a map, and a plurality of map-based contexts associated with locations on the map;
   a display for displaying images to the user;
   a processor coupled to the physical sensors, to the memory, and to the display, wherein the processor is programmed to determine a physical context of the computer system, in response to the plurality of physical perturbations, wherein the processor is programmed to determine whether the physical context is substantially similar to a map-based context from the plurality of map-based contexts associated with a map, wherein the processor is programmed to determine a location on the map associated with the map-based context, wherein the processor is programmed to determine a graphical user interface in response to the location on the map, and wherein the processor is programmed to display the graphical user interface on the display.

10. The computer system of claim 9 wherein the processor is programmed to use the location on the map as the user location on the map.

11. The computer system of claim 9
   wherein the plurality of physical sensors comprises a pressure sensor; and
   wherein the pressure sensor is configured to determine, an atmospheric pressure reading in response to the change in physical orientation of the computer system by the user.

12. The computer system of claim 9
   wherein the plurality of physical sensors comprises a magnetometer; and
   wherein the magnetometer is configured to determine a plurality of magnetic field readings in more than one axis in response to the change in physical orientation of the computer system by the user.

13. The computer system of claim 9
   wherein the plurality of physical sensors comprises a gyroscope; and
   wherein the gyroscope is configured to determine a plurality of rotational readings in more than one axis in response to the change in physical orientation of the computer system by the user.

14. The computer system of claim 9
   wherein the plurality of physical sensors comprises a temperature sensor; and
   wherein the temperature sensor is configured to determine a temperature reading in response to the change in physical orientation of the computer system by the user.

15. The computer system of claim 9 wherein the map-based context is selected from a group consisting of: moving down a hall, entering a room, turning left, turning right, descending floors, ascending floors.

16. The computer system of claim 9 wherein the processor is programmed to provide the location on the map to a navigation process running upon the processor.

17. The computer system of claim 16 wherein the processor is programmed to determine a navigation solution in the navigation processor running in the processor.

18. A computer-implemented method for determining an estimated user location performed on a computer system programmed to perform the method, comprising:
   determining an initial user position;
   determining in a plurality of physical sensors in the computer system, a plurality of physical perturbations in response to a change in physical orientation of the computer system by a user, wherein the plurality of physical sensors includes two or more sensors selected from the group consisting of an accelerometer, a magnetometer, a magnetometer, and a gyroscope;
   determining in a processor in the computer system, a physical context of the computer system, in response to the plurality of physical perturbations, the physical context describing a user movement associated with the plurality of physical perturbations;
   determining in the processor in the computer system, whether the physical context is substantially similar to one of a plurality of map-based contexts associated with a map, wherein each map-based context is configured to associate a physical context with a location on the map; and
   when a map-based context is substantially similar to the physical context,
   when the physical context is substantially similar to one of the plurality of map-based contexts, the method comprises:
      determining in the processor a location on the map associated with the one of the plurality of map-based context;
      determining in the processor a graphical user interface in response to the location on the map; and
      displaying on a display of the computer system, the graphical user interface to the user.

19. The computer-implemented method of claim 18 wherein determining an initial user position comprises the user indicating the initial user position to the computer system.

20. The computer-implemented method of claim 18 wherein determining an initial user position comprises determining the initial user position via wireless means.

21. The computer-implemented method of claim 20 wherein the wireless means comprises WiFi.

22. The computer-implemented method of claim 20 wherein the wireless means comprises near field communication.

* * * * *